Aug. 19, 1952     G. RUEGENBERG     2,607,235
EXPANDING-PULLEY VARIABLE-SPEED GEAR
Filed July 8, 1949
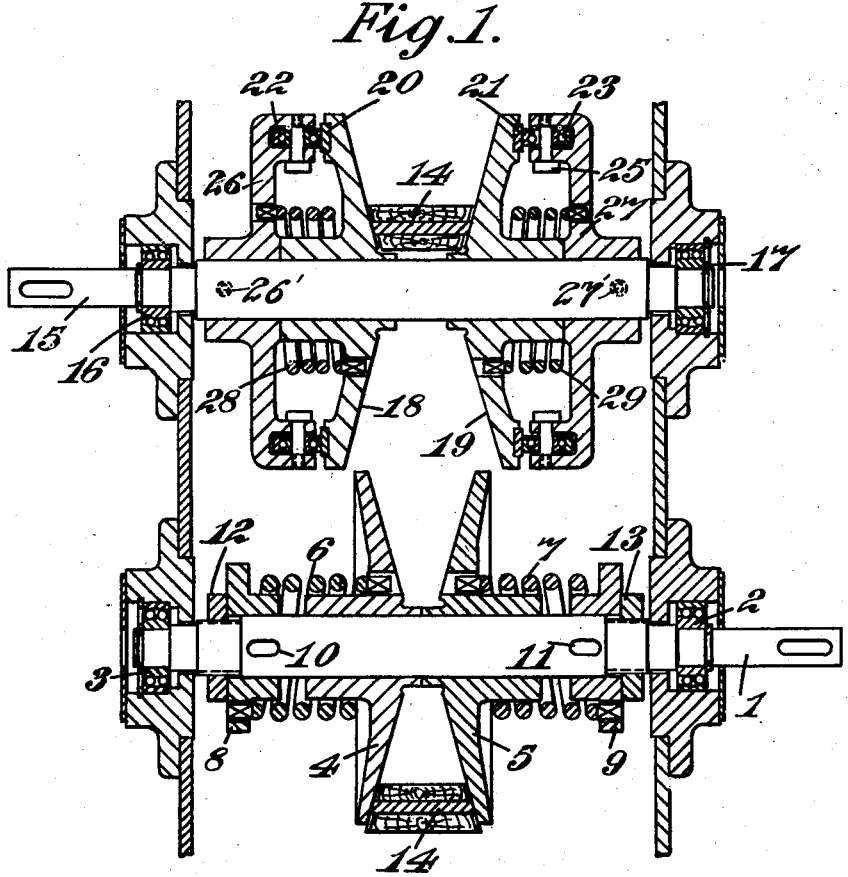
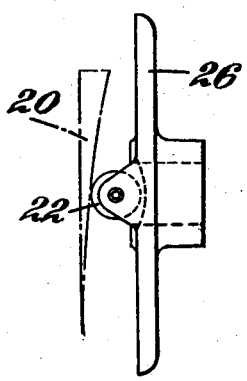
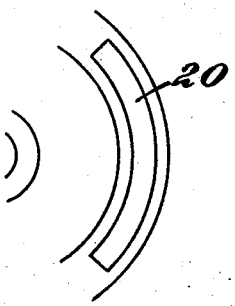
Inventor
Gottfried Ruegenberg
By Watson, Cole, Grindle
& Watson
Att'ys Patented Aug. 19, 1952

2,607,235

UNITED STATES PATENT OFFICE 2,607,235

EXPANDING-PULLEY VARIABLE-SPEED GEAR

Gottfried Ruegenberg, Krefeld, Germany

Application July 8, 1949, Serial No. 103,716
In Switzerland July 16, 1948

5 Claims. (Cl. 74—230.17)

Expanding-pulley variable speed gears are known of the type in which variations in speed are brought about by an endless driving member, e. g. a cone belt which is arranged between two pairs of bevel discs mounted in such a way that they can be moved axially, one pair of bevel discs being mounted on the driving shaft and the other one on the driven shaft. The axial movement of the bevel discs, in order to bring about a variation of speed is caused, as far as already known constructions are concerned, by a mechanism operated at will, for instance by hand.

This invention concerns an expanding-pulley variable speed gear of the aforesaid type, but according to the present invention, both pairs of bevel discs are arranged to be axially movable and are combined with means which automatically regulates the position of the two pairs of bevel discs, mounted on the driving and on the driven shafts respectively, when the turning moment derived from the driven shaft is changed. Thereby results a respective adjustment of the driving member and at the same time a speed adapted to the altered turning moment of the pair of bevel discs mounted on the driving shaft.

In a practical example of the invention the pairs of bevel discs mounted on the driving and on the driven shafts are not only axially movable but are also rotatably arranged, the discs bearing against elastic or resilient spring members or other elastic members which are connected with their respective shafts.

It is preferable that the bevel discs mounted on the driving shaft are connected with this shaft by wound (helical) bending stress-absorbing springs, especially wound springs, through which the driving torque is conveyed, while upon the bevel discs on the delivery shaft laterally curved surfaces are arranged. These lateral curved surfaces may bear against (supported) rotary members fixed to the driven shaft, or the bevel discs may bear against curved surfaces connected to the driven shaft. The axial gradient of the curved surfaces is suitably variably arranged corresponding to the changeable diameter of the running surface of the driving discs. For the transmission of the turning moment different kinds of driving mechanism can be used, for instance cone belts, joined cone belts, chain-like members, for example laminated chains or belts, jointed cone chains or the like.

For the purpose of better and fuller understanding, the invention will now be further described with reference to the accompanying drawings which diagrammatically illustrate the improved device and its details by way of example.

In the drawing:

Figure 1 is a cross sectional view of the gear when very little or no power is being transmitted, and, Figures 2 and 3 each show a detail from different points of view.

I is the driving shaft the respective ends of which are mounted in ball bearings 2 and 3, and said shaft carries two bevel discs 4 and 5. The discs 4 and 5 are rotatably mounted on the shaft I, so that they can be axially moved by prestressed exchangeable helical springs 6 and 7 which are axially arranged around shaft I and which urge the bevel discs 4 and 5 towards each other. In the position of the gear when very little or no power is being transmitted both of the bevel discs bear against each other at their centres. This position corresponds to the maximum running surface diameter, in which case the driving power of the driving member 14 is a minimum. The springs 6 and 7 bear at their other ends against bushes 8 and 9 which are mounted on the driving shaft I so as to permit their being moved in the direction of the axis and which are slidingly mounted on the shaft I by means of keys 10 and 11. Furthermore, nuts 12 and 13 are provided on the driving shaft I for securing the springs 6 and 7 in position against all movements in the axial direction. These springs 6 and 7 may receive a predetermined stress by a suitable adjustment of the nuts 12 and 13 respectively. At the same time the ends of the springs 6 and 7 drivingly engage the discs 4, 5 and the bushes so that the springs serve to transmit the turning moment from the bushes 8 and 9 to the bevel discs 4 and 5 respectively. For this purpose the ends of the spring are turned in the axial direction and introduced into respective openings or recesses in the bushes 8, 9 and the bevel discs 4, 5. In this way the frictional resistance which opposes the movements in axial direction of the bevel discs 4, 5 on the driving shaft I is kept low. A transmission of power generally used with gears of this kind, for instance by way of a laid-in key or a sliding spline would result in too high a moment of inertia owing to the frictional resistance caused by the tangential pressure on the key groove, whereby the continuity of the regulation of the speed would become influenced to a high degree.

The driving or power transmission member 14 in the represented example is an endless cone belt 14. By means of this belt the turning moment of the driving shaft 1 is transmitted to the driven shaft 15 which is mounted in bearings 16 and 17, e. g. ball bearings. On the shaft 15 the driven bevel discs 18 and 19 are arranged so as to be axially movable. In the drawings, the bevel discs 18, 19 are shown at their maximum distance from each other and thus at the minimum running surface diameter of the driving belt 14. On the outsides of the bevel discs 18 and 19 are fixed arcuate bearing discs 20 and 21 which bear against the outer rings of ball bearing assemblies 22 and 23, the latter being rotatably secured to driving plates 26 and 27 by bolts 24 and 25. These plates 26, 27 are firmly connected to the shaft 15 as by means of the pins 26' and 27'. Springs 28 and 29 are disposed between the members 18 and 26 and 19 and 27 and have their respective ends disposed in openings in the adjacent members and thus the springs serve to transmit the drive between the discs 18 and 19 and the plates 26 and 27. Springs 28 and 29 assist in the separation of the bevel discs 18, 19 by causing the ball bearings to roll down the curved surfaces 20, 21 upon reduction in the transmitted torque. At the same time they cause both of the bevel discs 18, 19 to be axially pressed towards each other, so that also during the position of the gear when very little or no power is being transmitted a sufficient tension of the belt 14 is ensured.

Figure 2 shows diagrammatically the play of movements between curved surfaces 20, 21 and the rolls 22, 23. The curved surfaces are curved in relief and on one hand they run concentrically with regard to the axis of the shaft while on the other hand they show a variating gradient in axial direction. In the drawing the curved surface is shown in a radial view unrolled on a plane surface.

The action of the mechanism described is as follows: Whereas in the case of known types of expanding-pulley variable speed gears, the axial changing of the bevel discs in order to vary the speed is caused by a mechanism to be operated at will from the outside, according to this invention the variation of the speed will be automatically regulated by the turning moment which is efficacious on the driven shaft 15. This is obtained by utilizing the axial forces resulting from the wedging effect of the driving member 14 between the pairs of bevel discs. On the driving shaft 1 the distance between the two bevel discs 4, 5 and the corresponding running surface diameter of the driving member 14, is regulated by the axial pressure of the springs 6 and 7 against the bevel discs 4, 5. On the driven shaft the distance between the two bevel discs 18, 19 and the corresponding running surface diameter of the driving member 14 is regulated by arcuate inclined surfaces 20 and 21, and that in the reverse sense compared with the driving part. Here the balance is kept against the axial forces resulting from the wedging effect of the belt 14, the axial forces of reaction of the turning moment on the driven shaft operating on the curved surfaces. This result is obtained by a variable gradient of the curves as shown in the drawing.

The sensitivity of reaction of the gear with regard to variations of the turning moment on the driven shaft depends on the degree of the friction resistance which opposes the axial movements of the bevel discs on the two shafts.

A transmission of power common with gears of this kind, e. g. by way of a laid-in key or a sliding spline would in this case result in too high a moment of inertia due to the frictional forces deriving from the tangential pressure exercised on the key groove and therewith the continuity of the regulation control of the number of revolutions would be strongly impaired. In order to avoid these jamming forces of friction the transmission of forces from the driving shaft 1 to the two bevel discs 4, 5 is effected, according to this invention, by the wound deformable springs 6, 7. Hereby all kinds of friction deriving from tangential pressure are completely avoided; furthermore owing to the torsion of the springs, in addition to the axial moving of the bevel discs, a rotating motion occurs in case of variations of the turning moment. By the spiral movement of the bevel discs on the shaft resulting therefrom, the frictional resistance is considerably diminished. Furthermore, the spiral screw springs cause a very smooth and bump-free starting of the gear.

In order to reduce the frictional forces on the curved surfaces of the driven gear as much as possible, the pressure on the bevel discs of these curved surfaces is suitably received by rollers borne by ball bearings. In order to guarantee the reverse run of the rollers in the decreasing sense of the curved surfaces, especially in the sphere of the smallest gradient, spiral deformable springs are provided between the bevel discs and the driven shaft, which springs receive a tangential tension if they run up on the curved surfaces in the reverse run, and with the help of this tension the frictional forces resulting from the axial resultant of the curve pressure are compensated. Here too the friction between the shaft and the bevel discs is considerably diminished by the resulting spiral movement.

On starting the gear, the bevel discs 4, 5 of the driving shaft 1 are positioned at first only a small distance apart. When the turning moment to be transmitted increases, the tension of the belt 14 will grow in such a manner, if a certain degree limit is surpassed, that the driving member 14 when approaching the driving shaft will press itself between the two discs 4, 5. So these will move apart against the pressure imparted by the springs 6 and 7. The axial forces of reaction will become effective at the curved surfaces of the driven shaft simultaneously with the reaction of the torque delivered from the driving shaft. After a certain limit value has been surpassed here too, an unstable balance, caused by the variating gradient of the curves, will be established between the axial forces of the cone drive and the curve pressures resulting from the respective turning moment, in a sense that together with an increasing curve pressure the distance between the bevel discs decreases i. e. the circular running surface diameter correspondingly increases.

The gear described has the advantage of being of a simple construction as well as providing variable speeds which are automatically regulated. Among other purposes, it may preferably be used for the actuation of such constructions in which, as for instance in the case of winding-on of flexible cloth bands, paper bands, and textile bands, metal sheets, wires or strip-iron, variable turning moments may occur, while the velocity of the band or the like as well as the drive which is imparted to it must be kept as constant as possible.

I claim:

1. An expanding-pulley, variable-speed gear, comprising a driving shaft, a driven shaft, two pairs of bevel discs, the discs of one of said pairs being slidably mounted on the driving shaft for free movement in axial, rotational, and combined axial and rotational directions with respect to said shaft, and the discs of the other pair being similarly mounted on the driven shaft; a V-belt drivingly connecting the two pairs of bevel discs; a resilient driving connection between the driving shaft and each of the bevel discs mounted thereon, said connections being such as to transmit torque from the driving shaft to said discs and to permit of the aforesaid movements of said discs upon said shaft, said resilient driving connections being such as normally to urge said bevel discs towards each other; a resilient torque-transmitting connection between each disc of the pair of discs on the driven shaft and said shaft, which torque-transmitting connections are such as to permit limited rotational, axial, and combined rotational and axial movements of the bevel discs on the driven shaft, and means embodied in said torque-transmitting connections between the driven shaft and the discs thereon for causing variations in torque imparted to the driven shaft to move the driven bevel discs thereon axially together or apart in such a manner that the axial movement is proportional to and varies as the torque applied at any instant to the driven bevel discs.

2. An expanding-pulley, variable-speed gear, as claimed in claim 1, wherein the resilient operative driving connection between the driving shaft and the bevel discs mounted thereon comprises two bushes rigidly connected to the driving shaft and a spring drivingly connecting each bevel disc to its associated bush, the said springs being so arranged as to permit of limited rotational, axial and combined rotational and axial movements of the bevel discs.

3. An expanding-pulley, variable-speed gear as claimed in claim 1, wherein the resilient torque-transmitting connection between the pair of bevel discs on the driven shaft and said shaft comprises two plates, rigidly connected to the driven shaft, a cam interposed between each plate and its associated bevel disc, and a spring for drivingly connecting each plate and bevel disc, said springs permitting of limited rotational, axial, and combined rotational and axial movements of the bevel discs.

4. An expanding-pulley, variable-speed gear, as claimed in claim 1, wherein the resilient operative driving connection between the driving shaft and the bevel discs mounted thereon comprises two bushes rigidly connected to the driving shaft and a spring drivingly connecting each bevel disc to its associated bush, the said springs being so arranged as to permit of limited rotational and axial movement of the bevel discs; and wherein the resilient torque-transmitting connection between the pair of bevel discs on the driven shaft and said shaft comprises two plates, rigidly connected to the driven shaft, a cam interposed between each plate and its associated bevel disc, and a spring for connecting each plate and bevel disc, said springs permitting of limited rotational and axial movement of the bevel discs.

5. An expanding-pulley, variable-speed gear, comprising a driving shaft, a driven shaft, said shafts having smooth surfaces, uninterrupted by keys, splines, pins or the like, two pairs of bevel discs, the discs of one of said pairs being slidably mounted on the smooth surface of the driving shaft for free movement in axial, rotational, and combined axial and rotational directions with respect to said shaft, and the discs of the other pair being similarly mounted on a smooth surface of the driven shaft; a V-belt drivingly connecting the two pairs of bevel discs; a resilient driving connection between the driving shaft and each of the bevel discs mounted thereon, each of said connections comprising a spring connected between the shaft and the disc and being the only driving connections between said driving shaft and said discs and also being such as to transmit torque from the driving shaft to said discs and to permit of the aforesaid movements of said discs upon said shaft, the springs of said driving connection being such as normally to urge said bevel discs towards each other; a resilient torque-transmitting connection between each of the bevel discs on the driven shaft and said shaft, each of said last named connections comprising a spring connected between the shaft and a disc, which torque-transmitting connections are such as to permit limited rotational, axial, and combined rotational and axial movements of the bevel discs upon the driven shaft, means embodied in said torque-transmitting connections for causing variations in torque imparted to the driven shaft to move the driven bevel discs thereon axially together or apart in such a manner that the axial movement is proportional to and varies as the torque applied at any instant to the driven bevel discs.

GOTTFRIED RUEGENBERG.

REFERENCES CITED

The following references are of record in the file of this patent:

UNITED STATES PATENTS

| Number | Name | Date |
| --- | --- | --- |
| 2,008,992 | Oak | July 23, 1935 |
| 2,050,358 | McElroy | Aug. 11, 1936 |
| 2,054,564 | Quirog | Sept. 15, 1936 |
| 2,478,289 | Lemon | Aug. 9, 1949 |

FOREIGN PATENTS

| Number | Country | Date |
| --- | --- | --- |
| 30,003 | Great Britain | 1912 |
| 132,800 | Great Britain | Aug. 12, 1920 |